United States Patent
Takatori et al.

(10) Patent No.: US 6,229,855 B1
(45) Date of Patent: *May 8, 2001

(54) ADAPTIVE TRANSMITTER FOR DIGITAL TRANSMISSION

(75) Inventors: Hiroshi Takatori, Sacramento, CA (US); Ahmed F. Shalash, Minneapolis, MN (US)

(73) Assignees: ADC Telecommunications, Inc., Minneapolis, MN (US); Level One Communications, Inc., Sacramento, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,632

(22) Filed: Aug. 22, 1997

Related U.S. Application Data

(60) Provisional application No. 60/025,344, filed on Sep. 3, 1996.

(51) Int. Cl.[7] ........................................ H04K 1/02
(52) U.S. Cl. ...................... 375/296; 370/201; 324/628; 455/522
(58) Field of Search ................................. 375/219, 296, 375/285, 257, 287, 288; 370/201, 282, 286; 379/399, 406, 410, 411; 455/500, 501, 127, 67.4, 522, 571, 14, 69, 115, 126; 324/628

(56) References Cited

U.S. PATENT DOCUMENTS

| 3,735,266 | * | 5/1973 | Amitay ................................ 370/201 |
| 4,087,639 | * | 5/1978 | Beene et al. ........................ 370/482 |
| 4,450,555 | * | 5/1984 | Pays .................................. 370/201 |
| 4,648,123 | * | 3/1987 | Schrock ................................. 455/69 |
| 5,063,351 | * | 11/1991 | Goldthorp et al. ................... 324/628 |
| 5,257,283 | * | 10/1993 | Gilhousen et al. .................. 455/522 |
| 5,276,918 | * | 1/1994 | Cornforth et al. ................... 455/571 |
| 5,313,656 | * | 5/1994 | Vaisanen et al. .................... 455/67.4 |
| 5,483,551 | * | 1/1996 | Huang et al. ......................... 375/219 |
| 5,548,222 | * | 8/1996 | Jensen et al. ......................... 324/628 |
| 5,731,706 | * | 3/1998 | Koeman et al. ...................... 324/628 |
| 5,754,943 | * | 5/1998 | Arai et al. ................................ 455/14 |
| 5,924,043 | * | 7/1999 | Takano ................................ 455/522 |

* cited by examiner

*Primary Examiner*—Lee Nguyen
*Assistant Examiner*—Conguen Tran
(74) *Attorney, Agent, or Firm*—Merchant & Gould P.C.

(57) ABSTRACT

A method for controlling the power and/or frequency output of a digital data network's transmitters is described. The method controls the transmitter power and/or frequency output by using line loss information as well as the noise margin at both the central office and remote site sides of the transmission link. The transmitters are controlled to minimize the crosstalk between the interconnections on the network. Measurements are taken of the cable losses and signal-to-noise ratios present on the system and the transmitter power and/or frequency are adjusted to minimize unwanted interactions between transceiver pairs on the network.

13 Claims, 4 Drawing Sheets

ADAPTIVE TRANSMITTER FOR DIGITAL TRANSMISSION

CROSS REFERENCE TO RELATED APPLICATION

This application is a utility application based on U. S. provisional patent application Ser. No. 60/025,344, filed on Sep. 3, 1996, entitled "ADAPTIVE TRANSMITTER FOR DIGITAL TRANSMISSION," by Hiroshi Takatori, et al. which application is incorporated by reference herein.

BACKGROUND OF THE INVENTION

1. Field of the Invention

This invention relates to high speed digital data networks, and more specifically refers to reducing the crosstalk between high speed data network interconnections.

2. Description of Related Art

Recently several high speed digital data services have become commercially available. These high speed digital data services are known as the ISDN (Integrated Services Digital Network) basic rate, HDSL (High Speed Digital Subscriber Loop), HDSL2 (High Speed Digital Subscriber Loop 2), ADSL (Asymmetric Digital Subscriber Loop), and T1 services. When offered by the same provider, they are typically installed in the same cable binder, and as the number of services increases, the number of cables in the cable binder increases. However, increased numbers of cables within the binder increases the crosstalk between cables, which degrades the transmission performance for each digital data service.

Each of the high speed digital data services described above typically connect two locations. The first location is typically the central office, and the other is typically a remote site. Normally, the central office site is considered the "master" and the remote site is the "slave" in terms of network synchronization. The central office is typically located at a fixed site while the remote site can be scattered over a very wide range of territory. In other words, the distance between the central office and the remote site can vary from 50 meters up to 5 kilometers depending on the location of the remote site. The cable bundle has connections distributed along the span of the cable bundle. As the number of cable pairs within the cable bundle increases, the crosstalk between pairs increases. The number of pairs within the bundle increases as the bundle gets closer to the central office, thus making the crosstalk more severe at the central office. The crosstalk interferes with proper signal transmission, thus affecting system performance.

There are two kinds of crosstalk, namely near end crosstalk (NEXT) and far end crosstalk (FEXT). In the practical network at hand where several different services are installed using different transmission methods, the NEXT is dominant over the FEXT. Therefore, methods to reduce the NEXT would have a greater effect on improving system performance.

The transmitter of the existing digital services have the nominal power required for each service. Even if the distance between the central office and the remote site is very short, the transmitter still uses the nominal transmit power and thus creates unnecessary crosstalk interference into the other pairs within the same bundle.

Although there are a few services that increase the transmit power (known as a "power burst" method) and emphasize the higher frequency content when the cable length is longer than the nominal case, the power control is not performed automatically, so additional human effort is required to maintain the service. This increases the cost of the digital service installation and maintenance. In addition, the existing power burst method is done independently, regardless of whether it is the central office or the remote site, and thus, if the power burst is performed at the central office side where the crosstalk is greater than that of the remote site, a power burst will create an even worse crosstalk environment.

It can be seen, then, that there is a need for an effective technique to reduce the crosstalk in digital data networks.

SUMMARY OF THE INVENTION

To overcome the limitations in the prior art described above, and to overcome other limitations that will become apparent upon reading and understanding the present specification, the present invention discloses a powerful and highly productive method for reducing crosstalk.

The present invention solves the above-described problems by using feedback from a high speed digital data service to determine transmission characteristics. This will raise or lower the signal strength in each cable and thus lower the interactions and crosstalk between cables in the same cable bundle.

The central office (HTU-C) receiver output signal-to-noise ratio (SNR) can be enhanced by boosting the power of the remote site (HTU-R) transmitter signal in the upstream (from remote site to central office) direction. Further improvement in performance can be achieved by reducing the HTU-C NEXT interference.

The worst case crosstalk scenario of the system is typically observed on the HDSL2 data connection at the central office (HTU-C) side of the transmission link because the number of cable pairs is larger at the central office side of the data system. The crosstalk from the ADSL is also higher at the central office side of the transmission link. The present invention measures the cable loss between the central office and the remote site, and determines from this measurement, and signal to noise measurements, when to change the transmitter power and/or frequency levels. The transmitter power level is usually increased at the remote site (HTU-R) to combat crosstalk at the central office, and is reduced at the central office to again minimize crosstalk affecting other pairs within the bundle.

A system in accordance with the principles of the present invention comprises software and hardware which provide a method for measuring the signal power from remote sites, evaluating the losses in the cable between a central office and the remote site, and adjusting the transmission power and frequency to optimize the signal transmission and reduce crosstalk.

One object of the present invention is to reduce near end crosstalk. It is a further object of the invention to increase digital data system performance. It is a further object of the invention to make it safer to operate digital data systems.

For a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides methods for reducing crosstalk in high speed digital data services, thereby increasing the performance and efficiency of the digital system.

Additional information regarding technical problems associated with digital data networks, and the solutions presented by the present invention, can be found in the ANSI T1E1.4 standards meeting presentation, attached to this application as Appendix 1, herein incorporated by reference.

Figure 1:
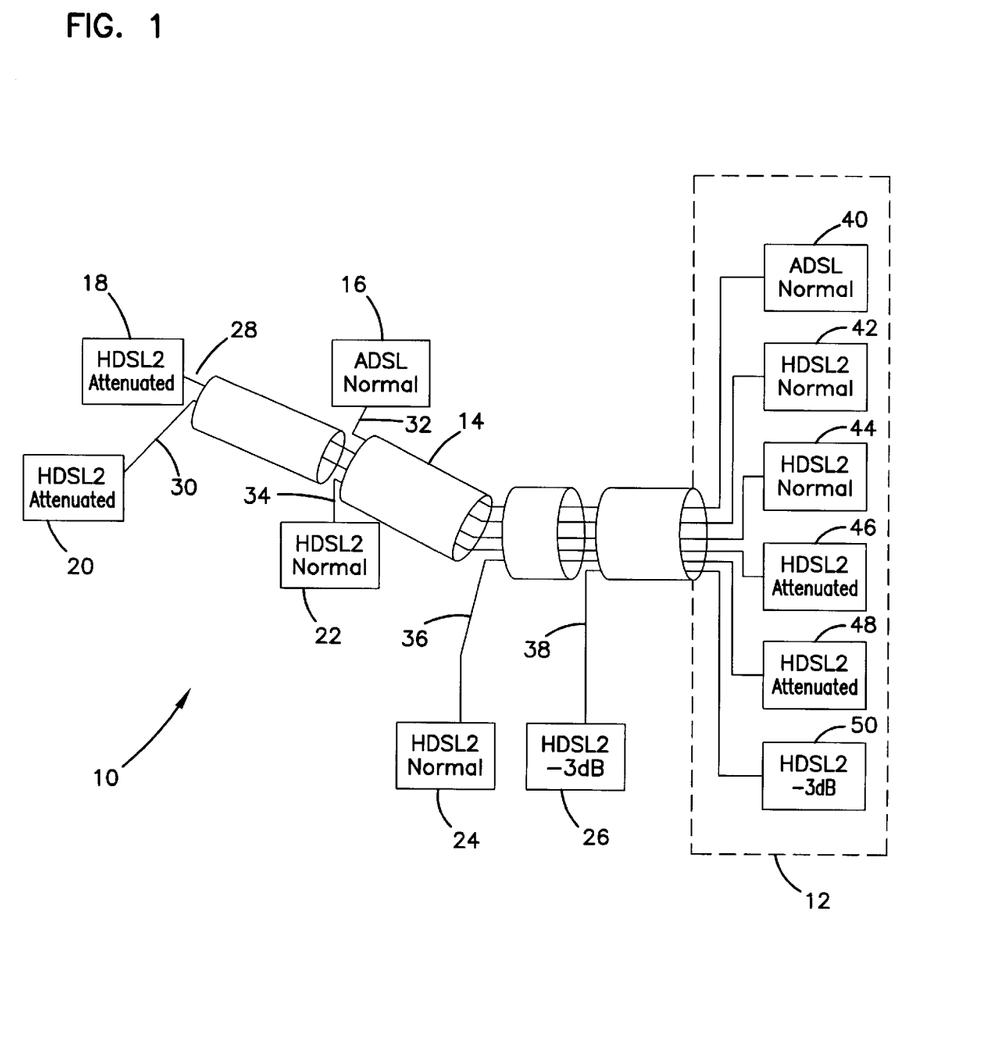
FIG. 1 is a block diagram of the digital data network used in the invention.

FIG. 1 is a block diagram of an exemplary digital data network. The digital data system 10 is illustrated by showing a central office 12, a cable bundle 14, and remote sites 16, 18, 20, 22, 24, and 26. Remote sites 18 and 20 are further away from the central office 12 than remote sites 16 and 22. Remote sites 16 and 22 are further away from the central office 12 than remote site 24. Remote site 24 is further away from the central office 12 than remote site 26. There can be more or less remote sites in a typical network, and the number of remote sites shown in FIG. 1 is shown only for reference.

As cable bundle 14 spans the distance from remote sites 18 and 20 to remote sites 16 and 22, only cable 28 and cable 30 are inside the cable bundle 14. As cable bundle spans the distance from remote sites 16 and 22 to remote site 24, additional cables, cable 32 and cable 34, are added to the cable bundle 14. As cable bundle 14 spans the distance between remote site 24 and remote site 26, cable 36 is added to the cable bundle 14. As cable bundle 14 spans the distance from remote site 26 to the central office 12, cable 38 is added to the cable bundle 14.

The electrical or electromagnetic interference between cables 28, 30, 32, 34, 36, and 38 is called "crosstalk." Crosstalk between any two or more of the cables in the cable bundle 14 reduces the accuracy and performance of the digital system 10. As additional cables are added to the cable bundle 14, for example, as the cable bundle 14 approaches the central office 12, the possibilities for crosstalk increase.

The central office 12 contains transceivers for each of the remote sites 16, 18, 20, 22, 24, and 26 in the digital network 10, wherein transceiver 40 is connected to remote site 16 via cable 32, transceiver 42 is connected to remote site 22 via cable 34, transceiver 44 is connected to remote site 24 via cable 36, transceiver 46 is connected to remote site 18 via cable 28, transceiver 48 is connected to remote site 20 via cable 30, and transceiver 50 is connected to remote site 26 via cable 38.

Figure 2:
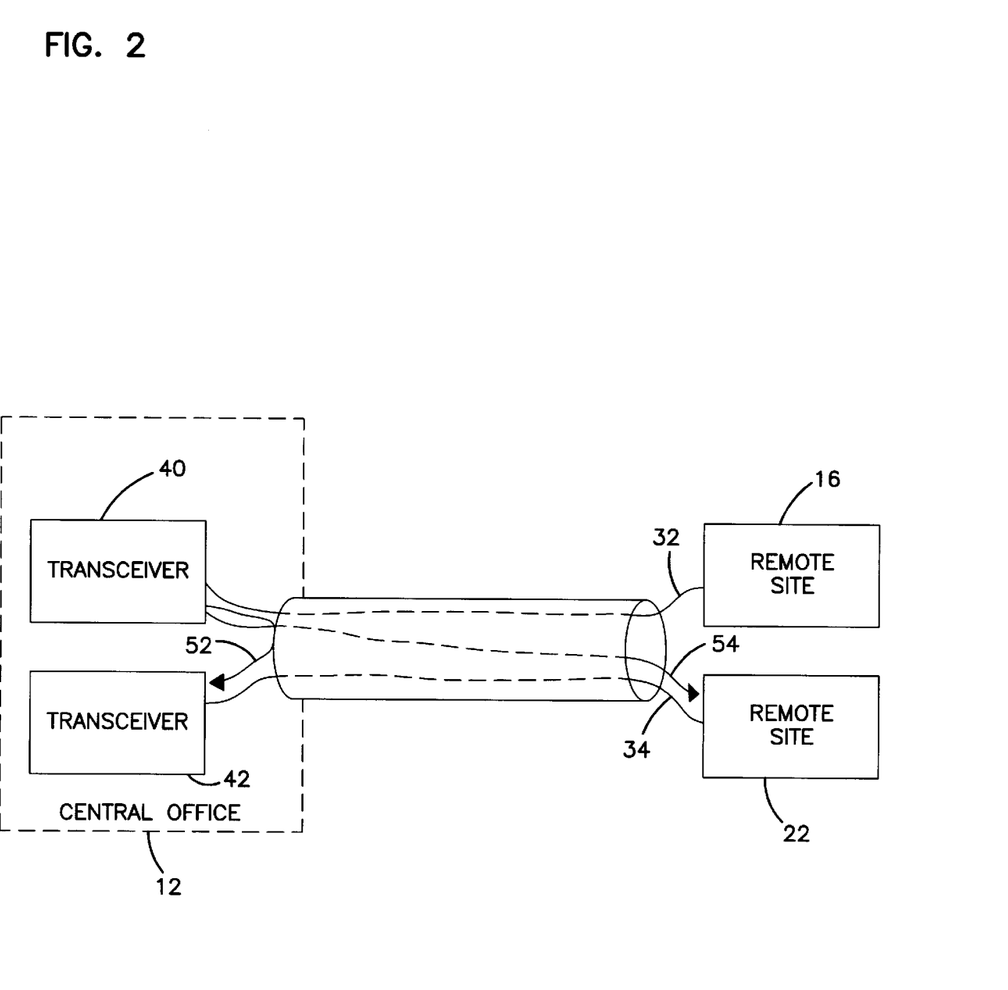
FIG. 2 is a block diagram illustrating the types of crosstalk within the digital data network.

FIG. 2 is a block diagram illustrating the types of crosstalk within the digital data network. For convenience, only two transceivers and two remote sites are shown. Remote site 16 is connected to transceiver 40 via cable 32, as also shown in FIG. 1. Remote site 22 is connected to transceiver 42 via cable 34, also as shown in FIG. 1. Crosstalk 52 occurs when electric or electromagnetic interference occurs between transceiver 40 and transceiver 42. Crosstalk 52 typically occurs when transceiver 40 is transmitting data from transceiver 40 to remote site 16. This crosstalk 52 is also known as near end crosstalk, or NEXT. Crosstalk 54 occurs when electronic or electromagnetic interference occurs between transceiver 40 and remote site 22. Crosstalk 54 typically occurs when transceiver 40 is transmitting data from transceiver 40 to remote site 16, and interference causes the transmission to affect the data on cable 34, which is connected to remote site 22. This crosstalk 54 is also known as far end crosstalk, or FEXT. Typically, NEXT dominates over FEXT in a given digital data system 10.

Figure 3:
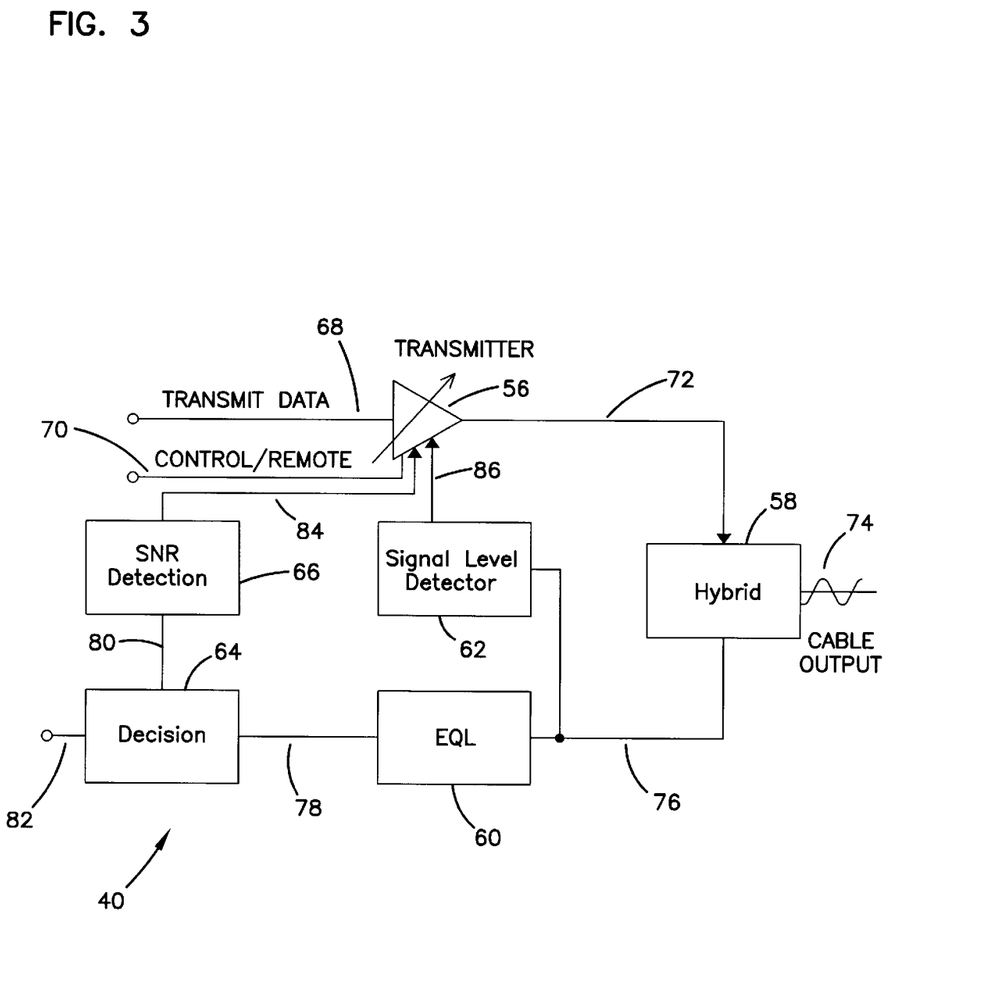
FIG. 3 is a block diagram of a transceiver that is typical of any of the transceivers located at the central office.

FIG. 3 is a block diagram of a transceiver 40 that is typical of any of the transceivers located at the central office 12. Transceiver 40 contains transmitter 56, hybrid 58, equalizer 60, signal level detector 62, decision block 64, and SNR detector 66. Transmitter 56 has data input 68, data input 68 containing the data to be transmitted by transmitter 56. Transmitter 56 also has control/remote input 70, and output 72. Output 72 connects transmitter 56 to hybrid 58. Hybrid 58 has cable output 74, which connects transceiver 40 to a remote site. Hybrid 58 has equalizer (EQL) connection 76 to connect hybrid 58 to equalizer 60 and signal level detector 62. Equalizer 60 is connected to decision block 64 by cable 78. Decision block 64 is connected to SNR detector 66 by cable 80. Decision block 64 also has a received data output 82. SNR detector 66 is connected to transmitter 56 by cable 84. Signal level detector 62 is connected to transmitter 56 by cable 86.

The transmit power or frequency can be controlled by the transmitter 56. Information is available to the transceiver 40 at the activation or start-up process, such as line loss, noise margin at the receive side (near-end), and the noise margin at the other side of the transmission link (far-end). The control process starts the transmitter 56 at the nominal power level or nominal frequency for the transmitter 56. The signal from a remote site comes into the transceiver 40 at received data output 82. The signal received passes through the decision block 64, where the signal-to-noise ratio (SNR) is detected by the SNR detector 66. The SNR detector 66 determines whether the SNR is high enough for the transmitter 56 to transmit at nominal power level or nominal frequency and still maintain proper data error rates. The main determination for the SNR detector is the cable loss between the transceiver 40 and the remote site.

The decision block 64 also receives the output 72 of the transmitter 56 from the equalizer 60. The equalizer 60 attenuates the transmitter signal to correspond with the received signal from the received data output 82.

The signal level detector 62 provides a feedback loop between the transmitter 56 and the cable output 74. The signal level detector helps to control the output 72 of the transmitter 56 by increasing or decreasing the power and/or frequency as required to minimize the crosstalk in the system.

The control/remote line 70 allows the transmitter 56 to receive messages from and transmit messages to the remote site transmitter.

The method starts with a nominal power level for the transmitter 56. The exchange of information between the ends of the transmission link that is described in the present invention determines the optimum transmit level to be used in the final activation of the system.

Once a received signal at the received data output 82 is detected, the SNR detector 66 evaluates the signal characteristics, based mainly on the cable losses between the transceiver 40 and the remote site. The SNR detector then determines whether the SNR of the received signal is too high or too low. This determination will depend mainly on the losses in the cable, which will depend mainly on the length of the cable between the central office and the remote site.

If the cable loss is more than a given number, say $X_1$ dB, the SNR of the received signal at the receive data input 82 will be too low. The SNR detector 66 then controls the transmitter 56 to increase the transmit power at the remote site transmitter, not the transmitter 56, level by $Y_1$ dB, or the transmit frequency by $Y_1$ Hz. The transmitter 56 then sends a signal to the remote transmitter on control/remote line 70 to increase the transmit power of the transmit level, which will increase the level of signal at received data output 82. This process will continue until SNR detector 66 determines that the SNR of the received data on receive data input 82 is acceptable.

If the cable loss is less than a given number, say $X_2$ dB, the SNR of the received signal at the receive data input 82 will be too high. The SNR detector 66 then controls the transmitter 56 to decrease the transmit power level by $Y_2$ dB, or the transmit frequency by $Y_2$ Hz, of the transmitter 56. The output 72 is thus decreased, and the power or frequency on the cable output 74 is decreased. The hybrid 58 splits some of this power or frequency off of the output 72 to send to the equalizer 60 and the signal level detector 62, to provide feedback to the transmitter 56 on cable 86. The equalizer 60 also passes this output signal level and frequency to the decision block 64, to help the SNR detector 66 determine the SNR of the incoming signal at the received data output 82.

Remote Site Power Boost

The transceiver at the remote site can receive data from the transmitter at the central office to increase power output or increase frequency as required, and the remote site can also reduce its power as necessary to maintain optimum power levels and minimize crosstalk. Up to 7000 feet, the desired noise margin (6 dB) at $1 \times 10^{-7}$ Bit Error Rate (BER) can be achieved. As currently available data pumps can estimate the line length, it is easy to determine whether the HTU-C transceiver is beyond the 7000 foot limit. The line driver circuit can be adjusted accordingly to amplify the output signal of the transceiver 40. The more power is boosted at the HTU-R side, the better the SNR at the HTU-C side becomes. Simple gain control such as this result in large jumps in the SNR for the system. Boosting the power of the HTU-R transceiver 40 will degrade the NEXT level at the remote site. If the power boost is limited to 2 dB, the HTU-C NEXT will still be more severe than the HTU-R NEXT. This results from the equalizer 60 being a non-linear device with many local minima of the solution (for the equalization of the signal). Where the power being transmitted in each direction is equal, the HTU-R margin is at least 3.6 dB better than the HTU-C margin.

Unbalancing the power between the upstream and downstream should utilize this difference in improving the HTU-C margin. For example, boosting the HTU-R upstream power by 3.5 dB will lead to equal margins in the HTU-C with 39 NEXT interferers and the HTU-R with 3 NEXT interferers. For an HTU-R with 7 NEXT interferers, boosting the upstream power by 2.2 dB will lead to equal margins at both ends.

Central Office Power Control

Performance of the digital data system can also be improved at the HTU-C side for short reach pairs. For example, the HTU-R margin for a 1000 foot 26 gauge cable can be more than 25 dB. By reducing the power required from the HTU-C side to reach the shorter reach transceiver, the interference inflicted upon the neighboring pair serving the full reach transceiver will be reduced. For a 5000 foot cable, the margin at the HTU-R side is still more than 15 dB, high enough to accommodate some reduction in the transmission power. Using a limit of 2 dB on power reduction, although higher or lower reduction factors may be used, and under a normal distribution of cable reach, 1 dB of margin improvement is easily obtained at the HTU-C side by reducing the HTU-C transmission power.

Preemphasis Deemphasis

The limiting impairment for the HDSL2 application is the NEXT at the HTU-C end. As the NEXT is not flat with frequency, the receiver equalizer 60 tries to whiten (flatten out) the NEXT interference. The simplified NEXT Power Spectrum Density (PSD) model PSD is given by:

$$S_{NEXT} = \chi f^{1.5}$$

where $\chi$ is the coupling constant, F is the frequency in Hz, and $S_{NEXT}$ is the self-generated NEXT (HDSL2 NEXT generated on another HDSL2 connection) interference at a given point in the cable. The monotonic increase in the NEXT-channel PSD with the frequency suggests that a preemphasis/deemphasis (PDE) method will improve the receiver SNR. The PDE will be used only for the upstream in conjunction with the power boosting. This would decrease the NEXT produced at the HTU-C end, as NEXT goes through only the deemphasis block. The PDE improves the received SNR at the equalizer 60 input, and relaxes the noise whitening required from the equalizer 60.

By using the frequency shift and power management techniques in conjunction, a 2.5 dB SNR margin improvement can be achieved for full reach Carrier Service Area (CSA) loops. Uncoded QAM/CAP-16 based transceivers 40 will give −1.5 dB margin with thirty-nine transceivers 40 (disturbers), Unger model of NEXT, on the digital data network; therefore, only 4.5 dB of additional coding gain will be needed to achieve a 6 dB margin in the system.

Figure 4:
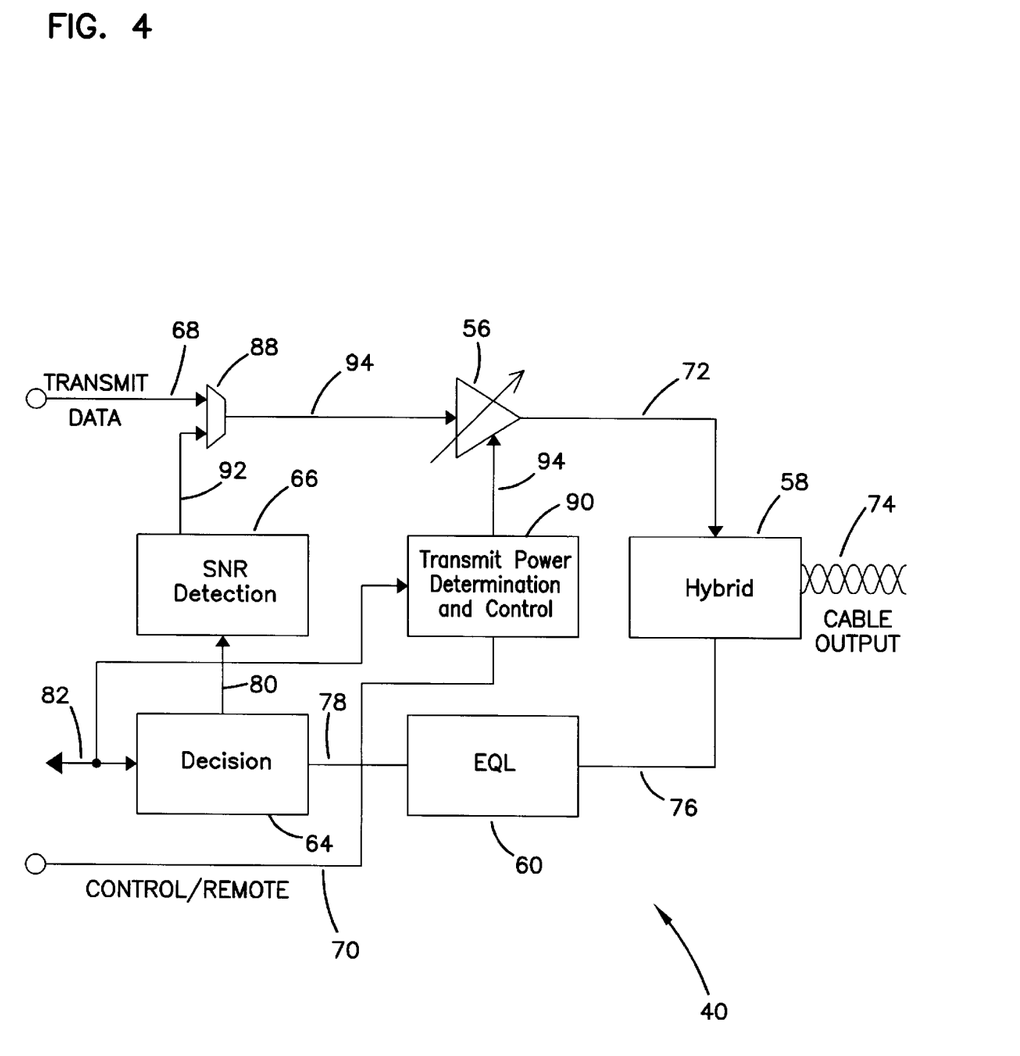
FIG. 4 is a block diagram of a second type of transceiver that is located at the central office.

FIG. 4 is a block diagram of a second type of transceiver 40 that is located at the central office. Transceiver 40 contains transmitter 56, hybrid 58, equalizer 60, decision block 64, SNR detector 66, multiplexer (mux) 88, and transmit power controller 90. Mux 88 has data input 68 that receives the data to be transmitted by transmitter 56. Mux 88 also has SNR input 92 receiving data from SNR detector 66. Mux 88 is connected to transmitter 56 by cable 94. Output 72 connects transmitter 56 to hybrid 58. Hybrid 58 has cable output 74, which connects transceiver 40 to a remote site. Hybrid 58 has EQL connection 76 to connect hybrid 58 to equalizer 60. Equalizer 60 is connected to decision block 64 by cable 78. Decision block is connected to SNR detector 66 by cable 80. Decision block 64 also has a received data output 82. Receive data input 82 is also connected to transmit power controller 90. Transmit power controller 90 is connected to transmitter 56 by cable 94.

The transmit power or frequency can be controlled by the transmitter 56. The control process starts at the nominal power level or nominal frequency of the transmitter 56. The signal from a remote site comes into the transceiver 40 at received data output 82. The signal received passes through the decision block 64 where the signal-to-noise ratio (SNR) is detected by the SNR detector 66. The SNR detector 66 determines whether the SNR is high enough for the transmitter 56 to transmit at nominal power level or nominal frequency and still maintain proper data error rates. The main determination for the SNR detector is the cable loss between the transceiver 40 and the remote site.

The decision block 64 also receives the output 72 of the transmitter 56 from the equalizer 60. The equalizer 60 attenuates the transmitter signal to correspond with the received signal from received data output 82.

The received data output 82 is also passed to the transmit power controller 90 to provide the receive data power and frequency to the transceiver 40 for controlling the transmitter 56.

The SNR detector 66 passes the SNR to the mux 88 which then multiplexes the SNR signal in with the data input 68. This multiplexed signal is fed to transmitter 56 by cable 94, and then to output 72, hybrid 58, and cable output 74.

Again, the transmitter 56 is set at a nominal level to begin the process. At both the transceiver 40 and the remote site, the SNR of the received signal from receive data input 82 is measured. If the SNR measured at both ends is greater than a given value, say $A_1$ dB, then a given value is subtracted from the transmit level of the central office (or from the transmit level of the remote site). The value that is subtracted is determined by the type of system, and is typically made up of two components.

The first component is related to the system being used. Typically, a 2B1Q or 16QAM/CAP system will have a value of 21.5 dB, a 3B1Q or 32CAP/QAM system will have a value of 24.5 dB, and a 16PAM or CAP/QAM64 system will have a value of 27.5 dB. This value is designated as value $B_1$.

In addition, each system will have an appropriate noise margin value, typically between 3 and 6 dB, designated as $M_1$. To determine the value, designated as $Z_1$, that will be sent to the transceiver at the other end of the digital data system, the following equation is used:

$$Z_1 = A_1 - (B_1 + M_1) \text{ in dB}$$

The value of $Z_1$ is sent to the transceiver at the other end of the data link, and upon receipt at the received data input 82, the transmitter 56 determines if the value of $Z_1$ received is positive or negative.

If $Z_1$ is positive, the transmitter 56 level at the central office is reduced by a value $Z_2$ dB. The SNR is calculated again, until $A_1$ falls below a specified value for the system.

If $z_1$ is negative, then $A_1$ is greater than the quantity $B_1 + M_1$. Thus, the transmitter 56 power must be increased at the remote site, to minimize the crosstalk. Thus, a signal is sent on control/remote line 70 to increase the transmit power at the remote site. The value that the remote site should increase the power or frequency of transmission is $Z_3$, where $Z_3$ may be different than the value $Z_2$.

Another method can also be used to control the transmitter 56 output. Instead of determining the value of the variable $Z_1$, a threshold can be set to determine when the transmitter 56 needs to be controlled. The table-driven transmit power controller 90 can be programmed as described in Table 1 or Table 2.

By using a straight comparison, the transmit power controller 90 can react faster to the given situation for transmit and receive power and/or frequency transmission control.

The transmit boost or reduction is controlled when all of the conditions required are met. For Case I of Table 2, if the noise margin at the remote site is less than 8 dB, which indicates that the crosstalk at the remote site is worse than the nominal case, the boost of the transmitter 56 should not occur, to prevent any spectral compatibility problems.

The 8 dB noise margin of Table 2 is chosen assuming the worst case scenario of 4.7 dB difference in the crosstalk between an 8 pair and a 49 pair system. In this way, a 5 dB final noise margin can be achieved even if only 8 pairs are in use during the activation and 49 pairs are used after the activation of the digital system. This takes into account a 1.7 dB improvement due to a 2 dB boost at the remote site transmitter. Cases II and III of Table 2 reduce NEXT and FEXT at the central office 12. The SNR detector 66 still contributes to the decision to boost or lower the power output of the transmitter 56 at the central office 12.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description.

TABLE 1

Control Method for the Adaptive Transmitter

|  | Near-end | Far-end | Line Loss | Transmit Power |
| --- | --- | --- | --- | --- |
| I | <6 dB | <6 dB | >30 dB | Nominal |
| II | <6 dB | <6 dB | <20 dB | Nominal |
| III | <6 dB | >12 dB | >30 dB | Nominal |
| IV | <6 dB | >12 dB | <20 dB | decrease |
| V | >12 dB | <6 dB | >30 dB | increase |
| VI | >12 dB | <6 dB | <20 dB | increase |
| VII | >12 dB | >12 dB | >30 dB | nominal |
| VIII | >12 dB | >12 dB | <20 dB | decrease |

TABLE 2

Alternative Control Method for the Adaptive Transmitter

|  | Central Office Noise Margin | Remote Noise Mgn | Line Loss | Transmit power |
| --- | --- | --- | --- | --- |
| I | <10 dB | >8 dB | >25 dB | Boost Remote Site Power |
| II | Don't care | >10 dB | <18 dB | Reduce Central Office Power |
| III | >10 dB | Don't care | <11 dB | Reduce Remote Site Power |

Where:

Near-end is the noise margin measurement made at the transceiver;

Far-end is the noise margin measurement made at the opposite end of the transmission link;

Line loss is the measurement made of the cable losses between the two transceivers; and Transmit power is the action taken by the transmit power controller 90 to control the transmitter 56 in the direction given in Table 1.

What is claimed is:

1. A crosstalk reduction device, comprising:

a transmitter having a variable output for transmitting a signal;

a hybrid, connected to the variable output of the transmitter, for diverting a portion of the variable output of the transmitter to a low power output;

an equalizer, coupled to the low power output of the hybrid, having an output;

a signal level detector, coupled to the low power output of the hybrid, for providing a first control signal to the transmitter to control the variable output of the transmitter using the low power output of the hybrid;

decision means having an output, coupled to the equalizer and further coupled to a received signal, for coupling the received signal and the output of the equalizer and for comparing at least one characteristic of the received signal to the output of the equalizer; and detection means, coupled to the decision means, for providing a second control signal to the transmitter to control the variable output of the transmitter using the output of the decision means.

2. The crosstalk reduction device of claim 1, wherein the transmitter further comprises communication means for communicating with at least one other transmitter.

3. The crosstalk reduction device of claim 2, wherein an output level of the at least one other transmitter is controlled.

4. A crosstalk reduction device, comprising:

a transmitter having a variable output for transmitting a signal;

a hybrid, connected to the variable output of the transmitter, for diverting a portion of the variable output of the transmitter to a low power output;

an equalizer, coupled to the low power output of the hybrid, having an output;

decision means having an output, coupled to the equalizer and further coupled to a received signal, for coupling the received signal and the output of the equalizer and for comparing at least one characteristic of the received signal to the output of the equalizer;

detection means, coupled to the decision means, having an output;

multiplexer means for providing a first control signal to the transmitter to control the variable output of the transmitter using the signal to be transmitted; and a signal level detector, coupled to the received signal, for providing a second control signal to the transmitter to control the variable output of the transmitter using a control line from a remote transmitter.

5. The crosstalk reduction device of claim 4, wherein an output level of the at least one other transmitter is controlled.

6. A method for reducing crosstalk in a digital data system, comprising:

setting a power level of a transmitter in a transceiver at a first site of the digital data system to a nominal value;

receiving a signal at the transceiver of the first site, the signal being transmitted from a transmitter in a transceiver at a second site of the digital data system; and evaluating continuously at least one transmission characteristic of the signal received at the first site to continuously control the transmitter of the first site to reduce crosstalk, wherein the power level of the transmitter at the second site is increased when a noise margin at the first site is less than a first predetermined noise margin value and a line loss is greater than a first predetermined line loss value, and the power level of the transmitter at the first site is reduced when the noise margin at the first site is greater than a second predetermined noise margin value and the line loss is less than a second predetermined line loss value.

7. The method of claim 6, wherein the transmitter at the first site is located at a central office of the digital data system.

8. The method of claim 7, wherein the transmitter at the second site is located at a remote site of the digital data system.

9. A method for reducing crosstalk in a digital data system, comprising:

providing a plurality of cables connected between a first site and a second site;

setting a power level of a transmitter in a transceiver at the first site of a digital data system to a nominal value;

receiving a signal at the transceiver of the first site, the signal being transmitted from a transmitter in a transceiver at the second site of the digital data system; and evaluating continuously at least one transmission characteristic of the signal received at the first site to continuously control the transmitter of the first site to reduce crosstalk the at least one transmission characteristic including a cable line loss value.

10. The method of claim 9, wherein the power level of the transmitter at the second site is increased when a noise margin at the first site is less than a first predetermined noise margin value and the cable line loss is greater than a first predetermined line loss value.

11. The method of claim 10, wherein the power level of the transmitter at the first site is reduced when the noise margin at the first site is greater than a second predetermined noise margin value and the cable line loss is less than a second predetermined line loss value.

12. The method of claim 9, wherein the transmitter at the first site is located at a central office of the digital data system.

13. The method of claim 12, wherein the transmitter at the second site is located at a remote site of the digital data system.

* * * * *

UNITED STATES PATENT AND TRADEMARK OFFICE
CERTIFICATE OF CORRECTION

PATENT NO.    : 6,229,855 B1                                     Page 1 of 1
DATED         : May 8, 2001
INVENTOR(S)   : Takatori et al.

It is certified that error appears in the above-identified patent and that said Letters Patent is hereby corrected as shown below:

Column 5,
Line 51, "Boosting the power..." should start a new paragraph.
Lines 59-60, there should be no new paragraph after "HTU-C margin."

Column 10, claim 9,
Line 30, "crosstalk the" should read -- crosstalk, the --

Signed and Sealed this

Eighth Day of January, 2002

Attest:

JAMES E. ROGAN
Attesting Officer    Director of the United States Patent and Trademark Office